United States Patent
Aoki et al.

[11] Patent Number: 5,388,402
[45] Date of Patent: Feb. 14, 1995

[54] SECONDARY AIR SUPPLY CONTROL SYSTEM FOR INTERNAL COMBUSTION ENGINES

[75] Inventors: Takuya Aoki; Tetsu Teshirogi, both of Wako, Japan

[73] Assignee: Honda Giken Kogyo Kabushiki Kaisha, Tokyo, Japan

[21] Appl. No.: 178,378

[22] Filed: Dec. 23, 1993

[30] Foreign Application Priority Data

Dec. 24, 1992 [JP] Japan .................. 4-359279

[51] Int. Cl.⁶ ............................................. F01N 3/20
[52] U.S. Cl. ........................................ 60/276; 60/285; 60/289; 60/307
[58] Field of Search ............. 60/274, 276, 284, 285, 60/287, 289, 300, 307, 290; 123/672, 674, 703

[56] References Cited

U.S. PATENT DOCUMENTS

| | | | |
|---|---|---|---|
| 3,086,353 | 4/1963 | Ridgway | 60/289 |
| 3,386,241 | 6/1968 | Saufferer | 60/289 |
| 3,779,015 | 12/1973 | Maruoka | 60/289 |
| 3,921,396 | 11/1975 | Nohira | 60/290 |
| 3,963,444 | 6/1976 | Yamada | 60/289 |
| 3,967,929 | 7/1976 | Tamazawa | 60/289 |
| 4,023,359 | 5/1977 | Masaki | 60/289 |
| 4,270,347 | 6/1981 | Fukuba | 60/276 |
| 4,406,120 | 9/1983 | Irish | 60/284 |
| 5,224,335 | 7/1993 | Yoshizaki | 60/300 |
| 5,285,639 | 2/1994 | Araki | 60/274 |

*Primary Examiner*—Ira S. Lazarus
*Assistant Examiner*—Daniel J. O'Connor
*Attorney, Agent, or Firm*—Nikaido, Marmelstein, Murray & Oram

[57] ABSTRACT

A secondary air supply control system for an internal combustion engine having at least one catalyst arranged in the exhaust system comprises an electric air pump for supplying secondary air to the exhaust system at a location upstream of the catalyst, and a catalyst temperature sensor for detecting the temperature of the catalyst. The ECU calculates a rate of variation in the temperature of the catalyst detected by the catalyst temperature sensor per a predetermined time interval, and controls an amount of secondary air to be supplied by means of the electric air pump, in response to the calculated rate of variation in the temperature of the catalyst.

10 Claims, 7 Drawing Sheets

SECONDARY AIR SUPPLY CONTROL SYSTEM FOR INTERNAL COMBUSTION ENGINES

BACKGROUND OF THE INVENTION

1. Field of the Invention

This invention relates to a secondary air supply control system for internal combustion engines, and more particularly to a system which controls an amount of secondary air to be supplied into the exhaust system of an internal combustion engine in a manner reflecting the temperature of catalysts provided in the exhaust system of the engine.

2. Prior Art

There is conventionally known a system for supplying secondary air into the exhaust system of an internal combustion engine in order to promote oxidation of CO and HC in exhaust gases from the engine and oxidizing and reducing reactions of a catalyst provided in the exhaust system and hence purify exhaust gas components. A system of this kind has been proposed, for example, by Japanese Provisional Patent Publication (Kokai) No. 59-138714, which supplies secondary air in amounts suitable for operating conditions of the engine, into the exhaust system, by means of an air pump which is driven by an electric motor, by controlling the rotational speed of the motor in response to operating conditions of the engine (e.g. engine rotational speed, engine load, and engine coolant temperature).

However, the above conventional system does not contemplate the temperature of the catalyst, so that the catalyst becomes activated with delay after the engine is started, thereby causing a temporary degradation in the exhaust emission characteristics.

SUMMARY OF THE INVENTION

It is the object of the invention to provide a secondary air supply control system for an internal combustion engine having an exhaust system, at least one catalyst arranged in the exhaust system for purifying exhaust gas components from the engine, and secondary air supply means for supplying secondary air into the exhaust system at a location upstream of the catalyst, comprising:

catalyst temperature-detecting means for detecting a temperature of the catalyst;

catalyst temperature variation rate-calculating means for calculating a rate of variation in the temperature of the catalyst detected by the catalyst temperature-detecting means per a predetermined time interval; and secondary air amount control means for controlling an amount of secondary air to be supplied by means of the secondary air supply means, in response to a change in the rate of variation in the temperature of the catalyst calculated by the catalyst temperature variation rate-calculating means.

Specifically, the secondary air amount control means decreases the amount of secondary air to be supplied when the calculated rate of variation in the catalyst temperature changes in a negative direction, and increases the amount of secondary air to be supplied when the calculated rate of variation in the catalyst temperature changes in a positive direction.

Preferably, the secondary air amount control means starts supply of secondary air when the temperature of the catalyst detected by the catalyst temperature-detecting means reaches a first predetermined temperature.

Also preferably, the secondary air amount control means terminates supply of secondary air when the temperature of the catalyst detected by the catalyst temperature-detecting means reaches a second predetermined temperature.

Further preferably, the secondary air supply control system further includes ignition timing control means for delaying ignition timing of the engine when the temperature of the catalyst detected by the catalyst temperature-detecting means is lower than a third predetermined temperature.

In one embodiment of the invention, the catalyst comprises a plurality of catalysts, and the catalyst temperature-detecting means comprises a catalyst temperature sensor provided at one of the catalysts, and catalyst temperature-estimating means for estimating a temperature of at least one catalyst other than the one catalyst, based on an output value from the catalyst temperature sensor.

Preferably, the secondary air supply control system further includes operating condition-detecting means for detecting operating conditions of the engine, and wherein the catalyst temperature-estimating means estimates the temperature of the at least one catalyst, based on the output value from the catalyst temperature sensor and operating conditions of the engine detected by the operating condition-detecting means.

The above and objects, features, and advantages of the invention will be more apparent from the following detailed description taken in conjunction with the accompanying drawings.

DETAILED DESCRIPTION

The invention will now be described in detail the drawings showing embodiments thereof.

Figure 1:
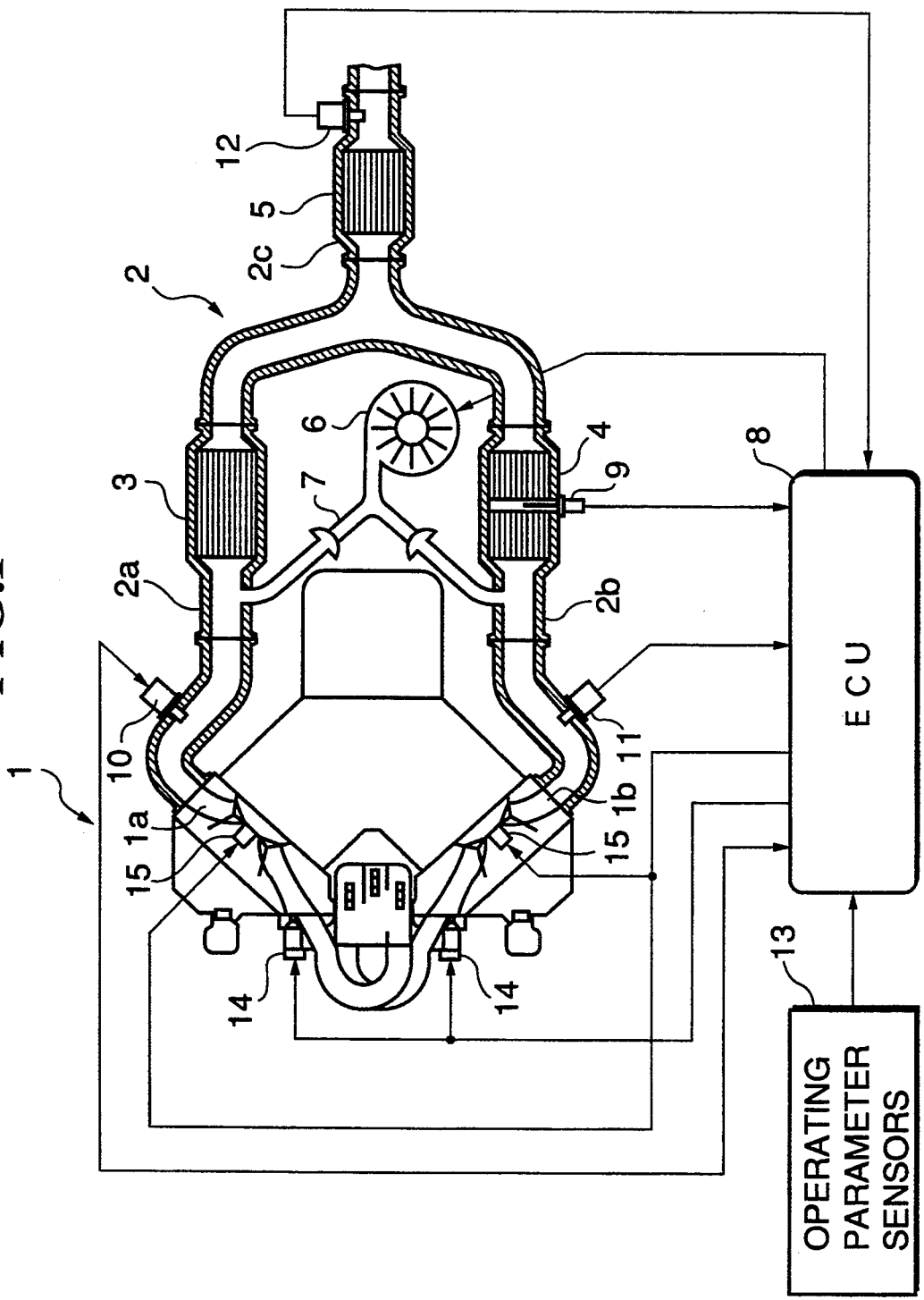
FIG. 1 is a block diagram showing the whole arrangement of an internal combustion engine incorporating a secondary air supply control system for controlling an amount of secondary air to be supplied, according to an embodiment of the invention.

Referring first to FIG. 1, there is shown the whole arrangement of an internal combustion engine incorporating a secondary air supply control system for controlling an amount of secondary air to be supplied, according to an embodiment of the invention.

In the figure, reference numeral 1 designates a V-type internal combustion engine having six cylinders (hereinafter simply referred to as "the engine"). An exhaust passage 2 is connected to exhaust ports 1a and 1b of the cylinders of the engine 1. More specifically, the exhaust passage 2 comprises a first passage 2a connected to exhaust ports 1a of three cylinders on an upper bank as viewed in the figure, a second passage 2b connected to exhaust ports 1b of three cylinders on a lower bank as viewed in the figure, and a third passage 2c connected to downstream ends of the first and second passages 2a and 2b at which they cojoin.

Arranged, respectively, in the first to third passages 2a, 2b and 2c are first to third three-way catalysts 3, 4 and 5. An air passage 7 is connected at both ends thereof to the first and second passage 2a, 2b at locations upstream of the first and second three-way catalysts 3 and 4. Connected to an intermediate portion of the air passage 7 is an electric air pump 6, which supplies secondary air into the first and second passages 2a and 2b. The air pump 6 is electrically connected to an electronic control unit (hereinafter referred to as "the ECU") 8 to have its operation controlled by a control signal therefrom.

Oxygen concentration sensors (hereinafter referred to as "the O2 sensor") 10 and 11 are arranged in the first and second passages 2a and 2b at locations upstream of the three-way catalysts 3 and 4, respectively. Further, another O2 sensor 12 is arranged in the third passage 2c at a location downstream of the three-way catalyst 5. The O2 sensors 10, 11 and 12 are electrically connected to the ECU 8 so that signals indicative of the sensed oxygen concentrations from these sensors 10 to 12 are supplied to the ECU 8.

Mounted in the second three-way catalyst 4 is a catalyst temperature sensor 9 which detects the temperature of the three-way catalyst 4. Further, various operating parameter sensors 13 are provided which detect various engine operating parameters, such as engine rotational speed NE, intake pipe absolute pressure PBA, and engine coolant temperature TW. The sensors 9 and 13 are electrically connected to the ECU 8 to supply signals indicative of the sensed parameters to the ECU 8.

Further electrically connected to the ECU 8 are a spark plug 15 and a fuel injection valve 14 for each of the cylinders of the engine 1. The ECU 8 controls ignition timing $\theta IG$ and a valve opening period (fuel injection period) TOUT of the fuel injection valve 14.

With the above arrangement, secondary air is supplied into the first and second exhaust passages 2a, 2b through the air passage 7 by means of the air pump 6, to promote oxidation of CO and HC in exhaust gases and oxidizing and reducing reactions of the catalysts 3 and 4 and hence promote purification of exhaust gas components. Further, the supply of secondary air is controlled in a manner hereinafter described so as to quickly increase the temperatures of the three-way catalysts 3 and 4 after the engine is started, to thereby promote activation of the catalysts.

Figure 2:
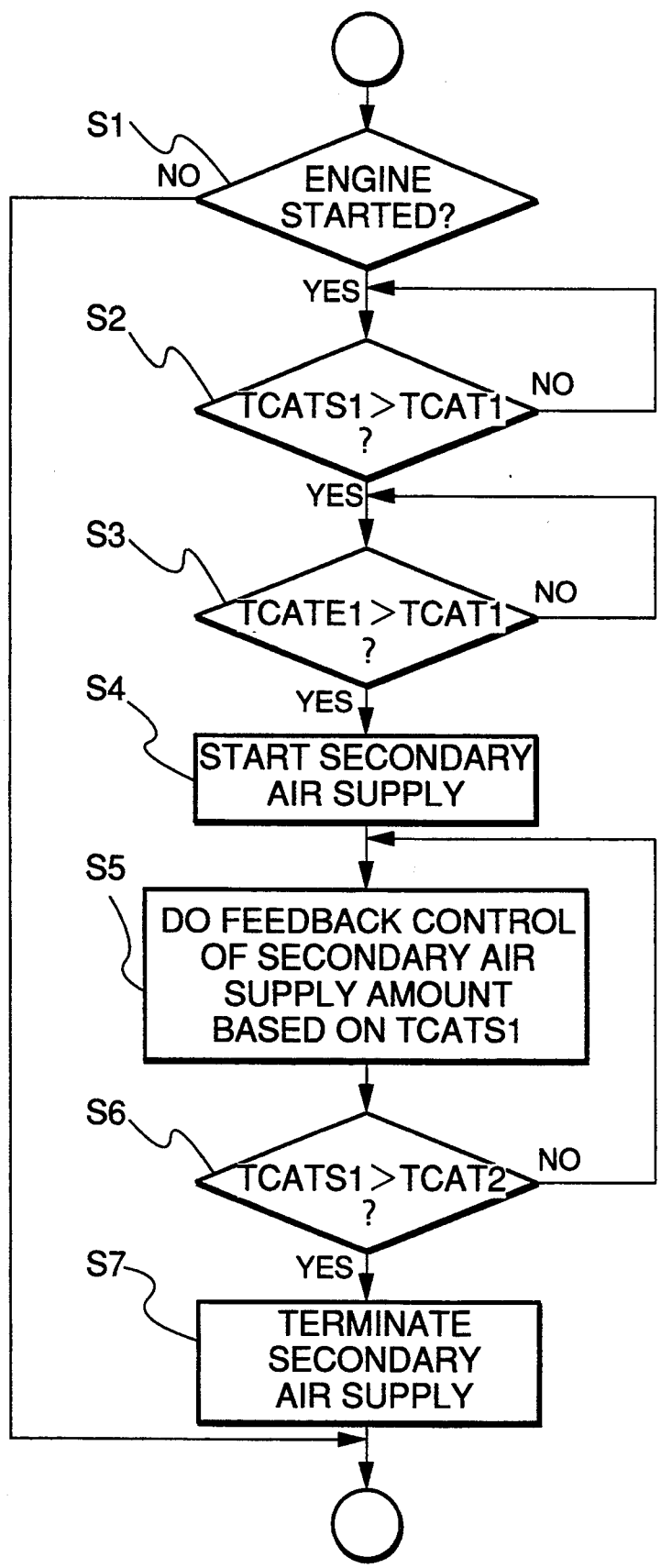
FIG. 2 is a flowchart showing a program for controlling an amount of secondary air to be supplied when the engine is started.

FIG. 2 shows a manner of controlling the air pump 6 by the ECU 8 when the engine is started. This program is executed at regular time intervals.

First, it is determined at a step S1 whether the engine has been started. If the engine has not been started, the program is immediately terminated. When the engine 1 has been started, it is determined at a step S2 whether or not a temperature TCATS1 detected by the catalyst temperature sensor 9, i.e. the detected temperature of the second three-way catalyst 4, is higher than a first predetermined temperature TCAT1 (e.g. 320° C.), and the program is held on standby until TCATS1>TCAT1 stands. This is because when the catalyst temperature is lower than the predetermined value TCAT1, supply of secondary air into the exhaust system cools the catalyst, thereby preventing activation of the catalyst. When the detected temperature TCATS1 exceeds the first predetermined temperature TCAT1, the program proceeds to a step S3, where it is determined whether or not an estimated temperature TCATE1 of the first three-way catalyst 3 exceeds the first predetermined temperature TCAT1. If TCATE1>TCAT1 does not stand, the program is held on standby, while if TCATE1>TCAT1 stands, the program proceeds to a step S4, where supply of secondary air is started.

The estimated temperature TCATE1 of the first three-way catalyst 3 is a temperature estimated by the ECU 8 through a calculation based on the detected temperature TCATS1 and taking into account a difference in the ambient temperature between the first and second three-way catalysts 3, 4 due to a difference in the mounting location between the first and second three-way catalysts 3 and 4. Practically, it is calculated by retrieving a table which is set in accordance with the value TCATS1.

While secondary air is supplied into the exhaust system, the amount of secondary air to be supplied (supply amount of secondary air) is feedback controlled based on the detected temperature TCATS1 at a step S5.

Figure 3:
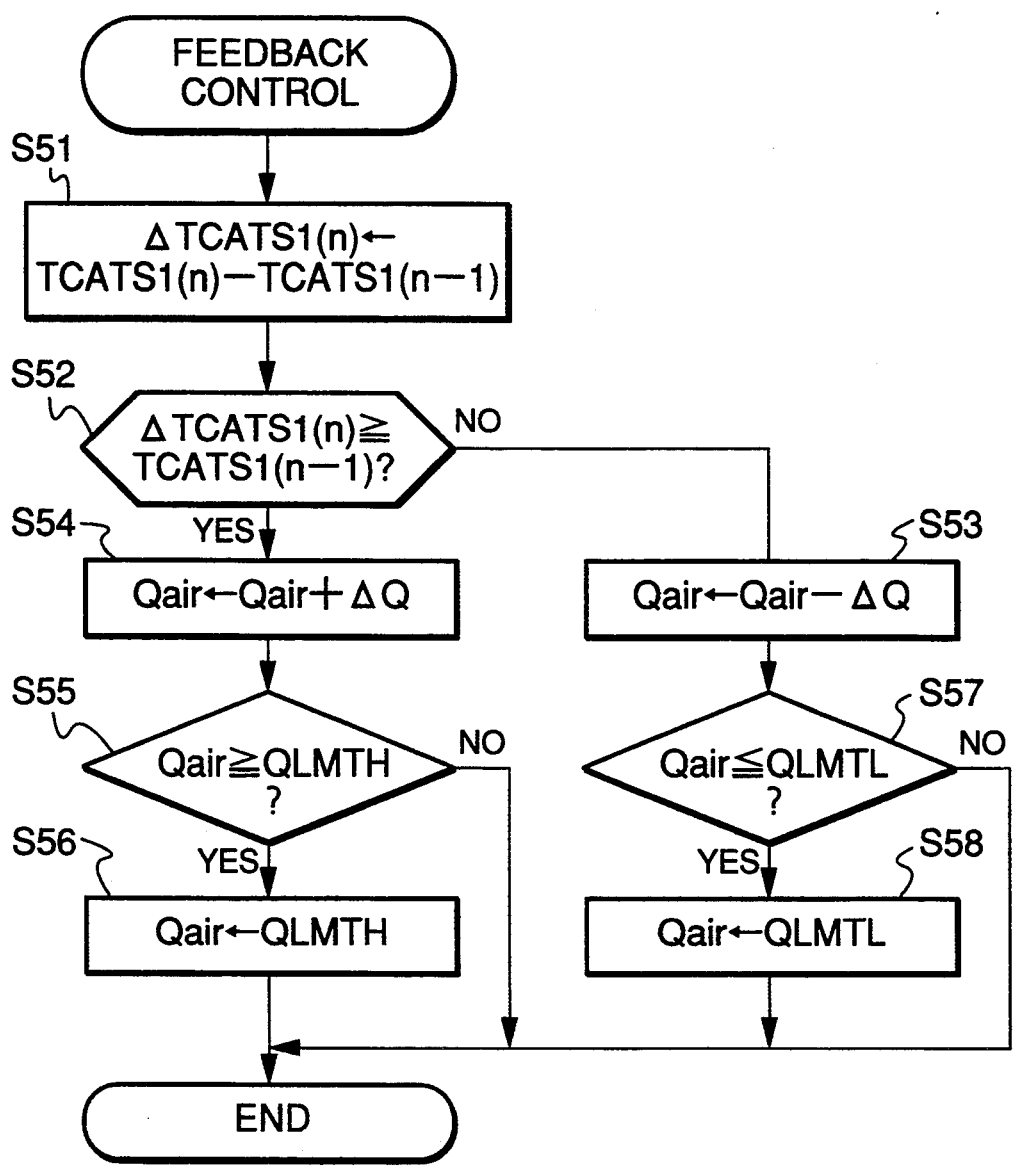
FIG. 3 is a flowchart showing details of a subroutine for carrying out secondary air amount feedback control executed at a step S5 in FIG. 2.

FIG. 3 shows a subroutine for carrying out secondary air amount feedback control based on the output from the catalyst temperature sensor 9. First, at a step S51, a rate of variation $\Delta TCATS(n)$ in the value TCATS1 per a predetermined time interval is calculated from a difference between a value TCATS1(n) obtained in the present loop and a value TCATS1(n−1) obtained in the immediately preceding loop. Then, it is determined at a step S52 whether or not a value of the rate of variation $\Delta TCATS1(n)$ in the present loop is larger than a value $\Delta TCATS1(n-1)$ obtained in the immediately preceding loop. If the answer is negative, i.e. if $\Delta XTCATS1(n)<\Delta TCATS1(n-1)$ stands, which means that the rate of increase in the detected temperature TCATS1 is lowering, it is judged that the amount of supplied secondary air is large, and therefore the secondary air amount Qair to be supplied is decreased by a predetermined amount $\Delta Q$ at a step S53. On the other hand, if $\Delta TCATS1(n) \geqq \Delta TCATS1(n-1)$ stands, which means that the rate of increase in the detected temperature TCATS1 is increasing, it is judged that the amount of supplied secondary air is small, and therefore the secondary air amount Qair is increased by the predetermined amount $\Delta Q$ at a step S54. The secondary air amount Qair thus calculated at the step S53 or S54 is subjected to limit checking. More specifically, if at a step S55 the secondary air amount Qair is equal to or larger than a predetermined upper limit QLMTH, the former is set to the latter at a step S56, followed by terminating the program, whereas if at a step S57, the secondary air amount Qair is equal to or smaller than a predetermined lower limit QLMTL, the former is set to the latter at a step S58, followed by terminating the program. If Qair<QLMTH stands at the step S55 or if Qair>QLMTL stands at the step S57, the program is immediately terminated to supply the calculated secondary air amount Qair as it is.

The reason why the supply amount of secondary air is controlled as described above is that supply of a suitable amount of secondary air promotes increase of the temperature of the three-way catalyst, whereas supply of an excessive amount of secondary air leads to lowering of the temperature of the three-way catalyst, or supply of too small an amount of secondary air does not contribute to an increase in the temperature of the three-way catalyst at all.

Referring again to FIG. 2, at a step S6, it is determined whether or not the detected temperature TCATS1 exceeds a second predetermined temperature TCAT2 (e.g. 400° C.) during the above feedback control. If the answer to the question of the step S6 is negative (NO), i.e. TCATS1>TCAT2 does not stand, the feedback control is continued. On the other hand, if the answer to the question of the step S6 is affirmative (YES), i.e. TCATS1>TCAT2 stands, it is determined that the catalyst temperature has reached the activation temperature of the catalyst at which the catalyst can be deemed to have been activated, followed by program proceeding to a step S7, where supply of secondary air is terminated.

By supplying secondary air into the exhaust system in the above described manner, a maximum rate of increase in the temperature can be obtained with a minimum amount of secondary air supplied. Thus, the temperatures of the three-way catalysts 3 and 4 can be quickly increased while minimizing the load applied on the air pump 6. As a result, the activation of the three-way catalysts 3 and 4 is promoted so that the catalysts 3, 4 become activated at an earlier time after the start of the engine, to thereby improve the exhaust emission characteristics.

Besides, employment of the estimated temperature can minimize the number of catalyst temperature sensors to be used.

Figure 4:
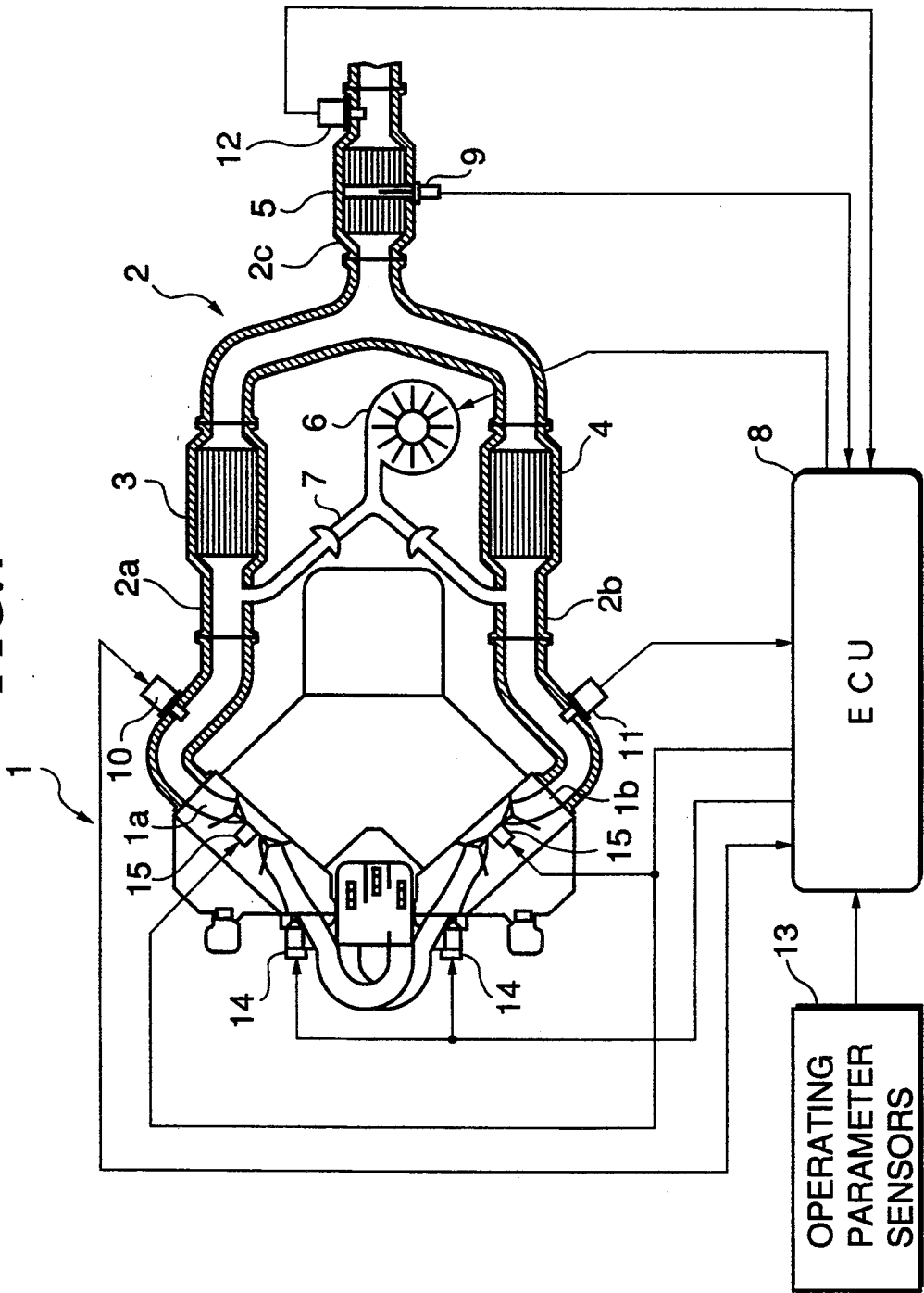
FIG. 4 is a block diagram showing the whole arrangement of an internal combustion engine incorporating a secondary air supply control system according to a further embodiment of the invention.

FIG. 4 shows the whole arrangement of an internal combustion engine incorporating a secondary air supply control system according to another embodiment of the invention, wherein the catalyst temperature sensor 9 is mounted not in the second three-way catalyst 4 but in the third three-way catalyst 5. The other elements and parts than the location of the catalyst temperature sensor 9, shown in the figure, are identical with those in FIG. 1.

Figure 5:
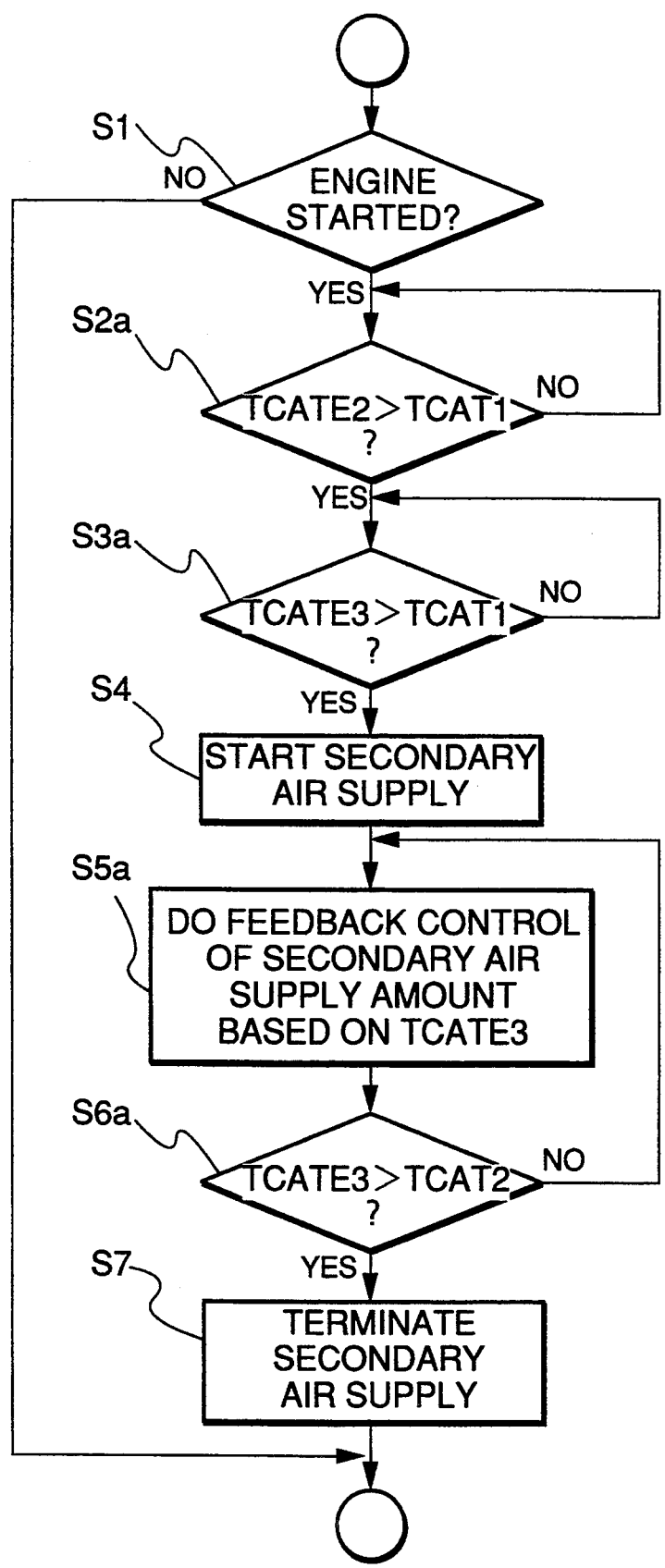
FIG. 5 is a flowchart showing a program for controlling an amount of secondary air to be supplied when the engine is started, according to the second embodiment.

FIG. 5 shows a manner of controlling the air pump 6, according to the present embodiment, where the steps S1, S4 and S7 are identical in processing with the corresponding steps with the same step numbers in FIG. 2.

At a step S2a in FIG. 5, it is determined whether or not an estimated temperature TCATE2 of the first three-way catalyst 3 is higher than the first predetermined temperature TCAT1. At a step S3a, it is determined whether or not an estimated temperature TCATE3 of the second three-way catalyst 4 is higher than the predetermined temperature TCAT1. If both of the values TCATE2 and TCATE3 exceed the first predetermined temperature, supply of secondary air is started at the step S4.

Figure 6:
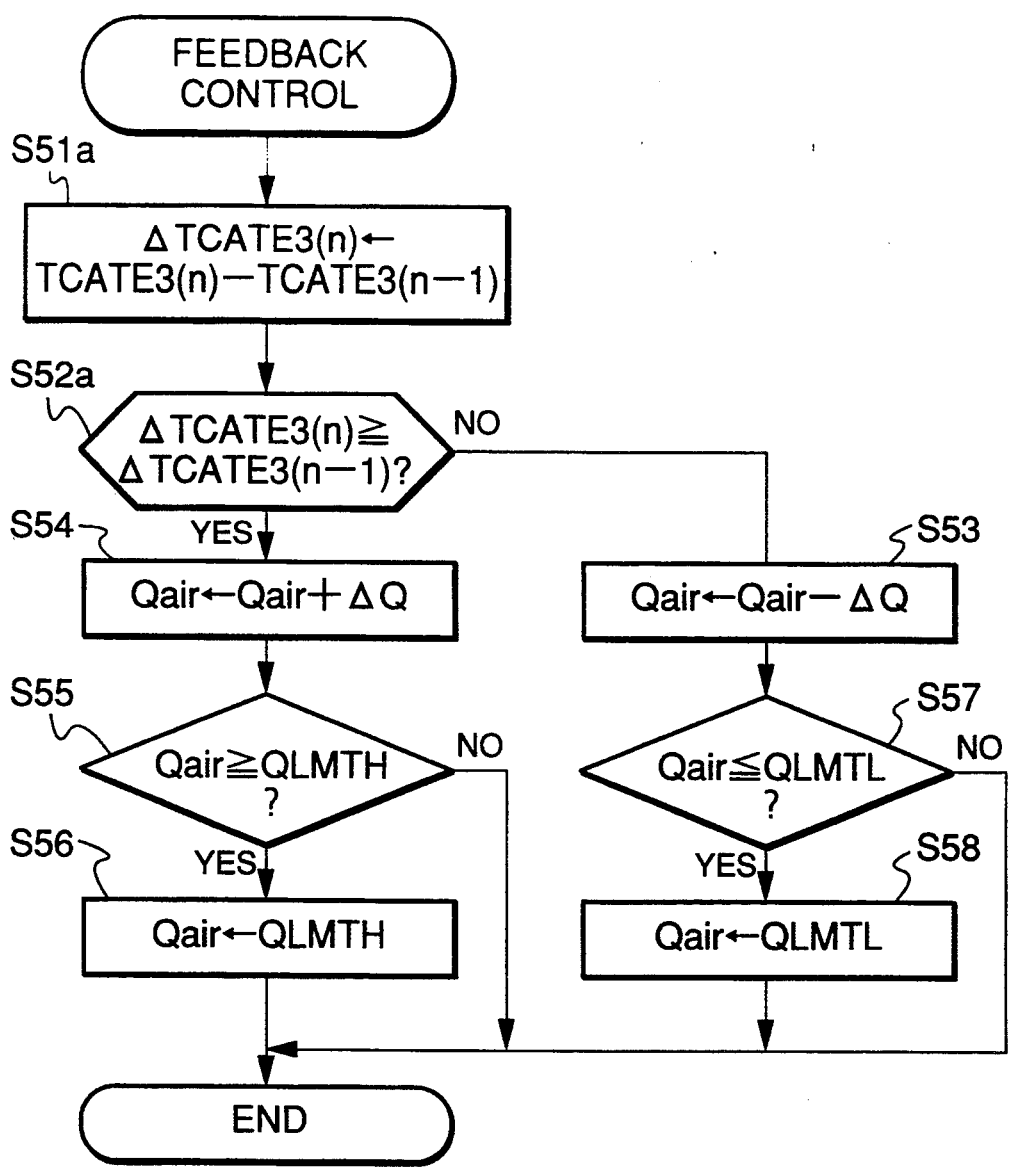
FIG. 6 is a flowchart showing details of subroutine for carrying out secondary air amount feedback control executed at a step S5a in FIG. 5.

At a step S5a, secondary air amount feedback control based on the estimated temperature TCATE3 of the second three-way catalyst 3 is carried out in a similar manner to the manner at the step S5 in FIG. 2 by a subroutine shown in FIG. 6. The program of FIG. 6 is distinguished from that of FIG. 3 only in steps S51a and S52a corresponding to the steps S51 and S52 in FIG. 3, in which a rate of variation ΔTCATE3(n) in the estimated temperature TCATE3 is calculated and a value ΔTCATE3(n−1) calculated in the present loop is compared with a value ΔTCATE3 calculated in the immediately preceding loop. The other steps in FIG. 6 are identical with the corresponding steps with the same step numbers, description of which is therefore omitted.

Referring again to FIG. 2, when the value TCATE3 exceeds the second predetermined temperature TCAT2 at a step S6a, the program proceeds to the step S7, where supply of secondary air is terminated.

In the program in FIG. 5, the estimated temperature TCATE3 of the second three-way catalyst 4 is calculated by the use of the following equation (1):

$$TCATE3 = K \times (NE)^a \times (TOUT)^b \times (A/F)^c \times TCATS2 \tag{1}$$

where TCATS2 represents the detected temperature of the third three-way catalyst 5 detected by the catalyst temperature sensor 9, NE the engine rotational speed, TOUT the fuel injection period, A/F the air-fuel ratio of exhaust gases detected by the O2 sensor 11, and a, b, and c constants obtained through experiments, respectively.

More specifically, the estimated temperature TCATE3 of the second three-way catalyst 4 is calculated by correcting the detected temperature TCATS2 of the downstream three-way catalyst 5 in response to the engine rotational speed NE, the fuel injection period TOUT and the air-fuel ratio A/F of exhaust gases. This calculation takes into account the fact that the temperature of the second three-way catalyst 4 has close correlation with these parameter values. The correlation between the catalyst temperature and the parameter values of engine rotational speed NE, the fuel injection period TOUT, and the air-fuel ratio A/F is described in Japanese Provisional Patent Publication (Kokai) No. 3-18643.

The estimated temperature TCATE2 of the first three-way catalyst 3 can be calculated by the use of an equation similar to the equation (1). In the present embodiment, however, the estimated TCATE2 is calculated in the same manner as in the first embodiment, based on the estimated temperature TCATE3 of the second three-way catalyst 4. That is, the value TCATE2 is calculated by retrieving a table set in accordance with the value TCATE3.

As described above, according to the present embodiment, by estimating the temperatures of the upstream three-way catalysts 3 and 4, based on the detected temperature of the three-way catalyst 5 arranged downstream of the catalysts 3, 4, the life of the catalyst temperature sensor 9 can be prolonged. This is because the temperature of the catalyst mounted in a downstream portion of the exhaust passage is lower than those of the catalysts mounted in upstream portions thereof.

Figure 7:
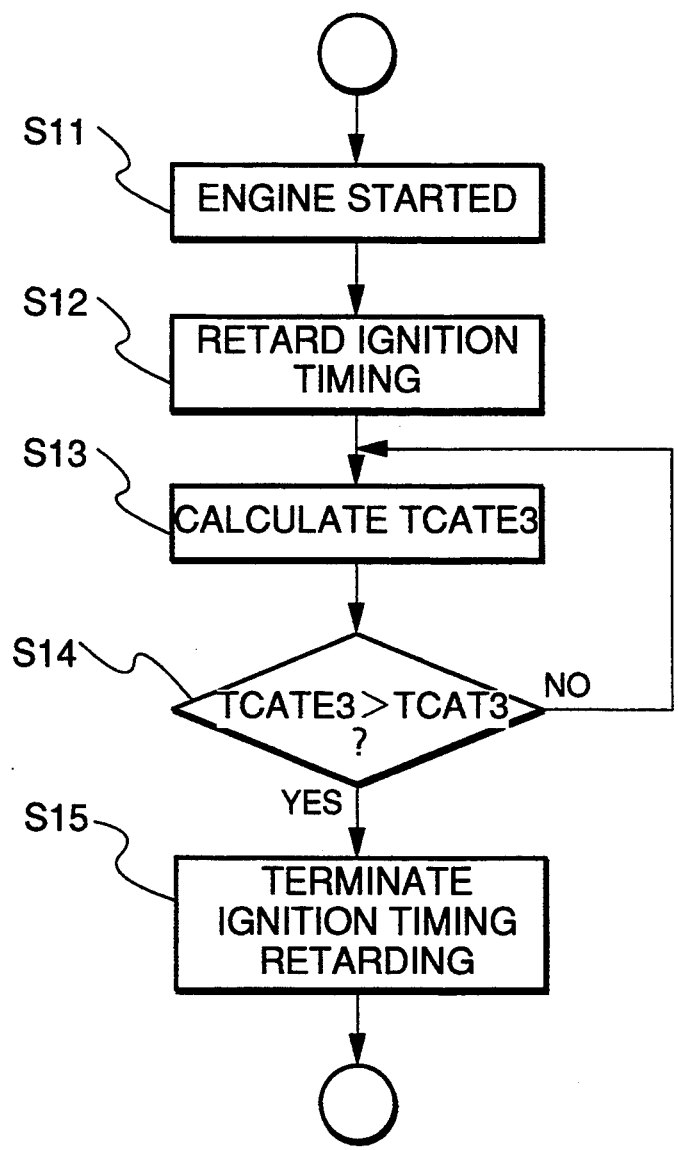
FIG. 7 is a flowchart showing a program for controlling the ignition timing to a retarded side when the engine is started, according to another embodiment of the invention.

The temperature of the three-way catalyst at the start of the engine can be quickly increased also by retarding the ignition timing of the engine in a manner shown in the flowchart of FIG. 7. This retarding control of the ignition timing may be carried out together with the secondary air amount control in the first or second embodiment described above.

First, when the engine 1 is started at a step S11, the ignition timing is retarded at a step S12, followed by calculation of the estimated temperature TCATE3 of the second three-way catalyst 4 at a step S13, to thereby determine whether or not the value TCATE3 is higher than a third predetermined temperature TCAT3 at a step S14. While TCATE3≦TCAT3 stands, retarding of the ignition timing is continued, whereas when the value TCATE3 exceeds the value TCAT3, the program proceeds to a step S15, followed by terminating the program.

Further, the upstream catalysts 3, 4 may be provided with electric heating means which generate heat by electric current supplied thereto, in order to heat them and hence promote activation of the same particularly when the temperatures of the catalysts are low. For example, upon the lapse of a predetermined time period (e.g. 10 sec) after the start of the engine, the electric heater means starts to be energized. When the catalyst temperature sensed by the catalyst temperature sensor 9 rises up to a first predetermined temperature TCAT1, the supply of secondary air is started. Thereafter, when the sensed catalyst temperature further rises up to a second predetermined temperature TCAT2, the supply of second air is stopped and at the same time the electric heater means are deenergized.

As described above in detail, according to the secondary air supply control system of the invention, the temperature of the catalyst arranged in the exhaust passage of the engine is detected, and an amount of the secondary air to be supplied is controlled according to a rate of variation in the catalyst temperature per a predetermined time interval. Therefore, a maximum rate of an increase in the temperature can be obtained by supplying a minimum amount of secondary air, so that the temperature of the catalyst is quickly increased while minimizing the load applied to the secondary air supply means. As a result, activation of the catalyst after the start of the engine can be quickened, resulting in improved exhaust emission characteristics.

What is claimed is:

1. A secondary air supply control system for an internal combustion engine having an exhaust system, at least one catalyst arranged in said exhaust system for purifying exhaust gas components from said engine, and secondary air supply means for supplying secondary air into said exhaust system at a location upstream of said catalyst, comprising:

catalyst temperature-detecting means for detecting a temperature of said catalyst;

catalyst temperature variation rate-calculating means for calculating a rate of variation in the temperature of said catalyst detected by said catalyst temperature-detecting means per a predetermined time interval; and secondary air amount control means for controlling an amount of secondary air to be supplied by means of said secondary air supply means, in response to a change in the rate of variation in the temperature of said catalyst calculated by said catalyst temperature variation rate-calculating means, wherein said amount of secondary air is varied with a change in the rate of variation in the temperature of the catalyst.

2. A secondary air supply control system as claimed in claim 1, wherein said secondary air amount control means decreases the amount of secondary air to be supplied when the calculated rate of variation in said catalyst temperature changes in a negative direction.

3. A secondary air supply control system as claimed in claim 1, wherein said secondary air amount control means increases the amount of secondary air to be supplied when the calculated rate of variation in said catalyst temperature changes in a positive direction.

4. A secondary air supply control system as claimed in claim 1, wherein said secondary air amount control means inhibits supply of secondary air before the temperature of the catalyst detected by the catalyst temperature detecting means exceeds a first predetermined temperature lower than a temperature or above which said catalyst can be activated and starts supply of secondary air when the temperature of said catalyst detected by said catalyst temperature-detecting means reaches said first predetermined temperature.

5. A secondary air supply control system as claimed in claim 1, wherein said secondary air amount control means permits supply of secondary air before the temperature of the catalyst detected by the catalyst-temperature-detecting means exceeds a second predetermined temperature at or above which said catalyst can be activated and terminates supply or secondary air when the temperature of said catalyst detected by said catalyst temperature-detecting means reaches said second predetermined temperature.

6. A secondary air supply control system as claimed in claim 1, further including ignition timing control means for delaying ignition timing of said engine when the temperature of said catalyst detected by said catalyst temperature-detecting means is lower than a third predetermined temperature.

7. A secondary air supply control system as claimed in claim 1, wherein said catalyst comprises a plurality of catalysts, said catalyst temperature-detecting means comprising a catalyst temperature sensor provided at one of said catalysts, and catalyst temperature-estimating means for estimating a temperature of at least one catalyst other than said one catalyst, based on an output value from said catalyst temperature sensor.

8. A secondary air supply control system as claimed in claim 7, further including operating condition-detecting means for detecting operating conditions of said engine, and wherein said catalyst temperature-estimating means estimates the temperature of said at least one catalyst, based on said output value from said catalyst temperature sensor and operating conditions of said engine detected by said 9. A secondary air supply control system for an internal combustion engine having an exhaust system, at least one catalyst arranged in said exhaust system for purifying exhaust gas components from said engine, and secondary air supply means for supplying secondary air into said exhaust system at a location upstream of said catalyst, comprising:

catalyst temperature-detecting means for detecting a temperature of said catalyst;

catalyst temperature variation rate-calculating means for calculating a rate of variation in the temperature of said catalyst detected by said catalyst temperature-detecting means per a predetermined time interval; and secondary air amount control means for controlling an amount of secondary air to be supplied by means of said secondary air supply means, in response to a change in the rate of variation in the temperature of said catalyst calculated by said catalyst temperature variation rate-calculating means, wherein said catalyst comprises a plurality of catalysts, said catalyst temperature-detecting means comprising a catalyst temperature sensor provided at one of said catalysts, and catalyst temperature-estimating means for estimating a temperature of at least one catalyst other than said one catalyst, based on an output value from said catalyst temperature sensor.

10. A secondary air supply control system as claimed in claim 9, further including operating condition-detecting means for detecting operating conditions of said engine, and wherein said catalyst temperature-estimating means estimates the temperature of said at least one catalyst, based on said output value from said catalyst temperature sensor and operating conditions of said engine detected by said operating condition-detecting means.

* * * * *